United States Patent
Heo et al.

(10) Patent No.: US 10,321,157 B2
(45) Date of Patent: Jun. 11, 2019

(54) VIDEO DECODING METHOD AND APPARATUS FOR DECODING MULTI-VIEW VIDEO

(71) Applicant: LG ELECTRONICS INC., Seoul (KR)

(72) Inventors: Jin Heo, Seoul (KR); Sunmi Yoo, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 305 days.

(21) Appl. No.: 15/026,152

(22) PCT Filed: Oct. 20, 2014

(86) PCT No.: PCT/KR2014/009858
§ 371 (c)(1),
(2) Date: Mar. 30, 2016

(87) PCT Pub. No.: WO2015/057036
PCT Pub. Date: Apr. 23, 2015

(65) Prior Publication Data
US 2016/0249066 A1    Aug. 25, 2016

Related U.S. Application Data

(60) Provisional application No. 61/892,452, filed on Oct. 18, 2013, provisional application No. 61/892,466, filed on Oct. 18, 2013.

(51) Int. Cl.
*H04B 1/66* (2006.01)
*H04N 19/597* (2014.01)
(Continued)

(52) U.S. Cl.
CPC ......... *H04N 19/597* (2014.11); *H04N 19/117* (2014.11); *H04N 19/176* (2014.11);
(Continued)

(58) Field of Classification Search
CPC .. H04N 19/597; H04N 19/513; H04N 19/463; H04N 19/91; H04N 19/70; H04N 19/82
(Continued)

(56) References Cited

U.S. PATENT DOCUMENTS

2013/0258052 A1* 10/2013 Li ..................... H04N 13/161
348/43
2014/0294088 A1* 10/2014 Sung .................. H04N 19/597
375/240.16

FOREIGN PATENT DOCUMENTS

JP    2006304307 A    11/2006
JP    2015019140 A    1/2015
(Continued)

OTHER PUBLICATIONS

Ikai ("ARP simplification", JCT-3V Meeting; Vienna; Thejoint Collaborative Team on 3D Video Coding Extension Development of ISO/IECJTC1/SC29/WG11 and ITU-T SG.16; URL: http://phenix.int-evry.fr/jct2/, (Year: 2013).*
(Continued)

*Primary Examiner* — Sathyanaraya V Perungavoor
*Assistant Examiner* — Peet Dhillon
(74) *Attorney, Agent, or Firm* — Dentons US LLP

(57) ABSTRACT

The present invention relates to a method and an apparatus for coding a multi-view video, and a decoding apparatus according to the present invention comprises: an entropy-decoding unit for entropy-decoding a bitstream and decoding information related to residual prediction by referencing neighboring blocks of a current block; a memory for saving pictures referenced when decoding the current block; a prediction unit for inducing a prediction sample of the current block, based on the difference between sample values of a first block and a second block corresponding to the current block, from among the pictures saved to the memory, by using the residual-related information; and a
(Continued)

filtering unit for applying filtering to a current picture restored by using the prediction sample.

3 Claims, 10 Drawing Sheets

(51) Int. Cl.
  *H04N 19/91* (2014.01)
  *H04N 19/117* (2014.01)
  *H04N 19/176* (2014.01)
  *H04N 19/513* (2014.01)
  *H04N 19/463* (2014.01)
  *H04N 19/70* (2014.01)
  *H04N 19/82* (2014.01)

(52) U.S. Cl.
  CPC ......... *H04N 19/463* (2014.11); *H04N 19/513* (2014.11); *H04N 19/91* (2014.11); *H04N 19/70* (2014.11); *H04N 19/82* (2014.11)

(58) Field of Classification Search
  USPC .................................................... 375/240.12
  See application file for complete search history.

(56) References Cited

FOREIGN PATENT DOCUMENTS

| JP | 2016-503971 A | 2/2016 |
|---|---|---|
| KR | 10-2012-0011428 A | 2/2012 |
| KR | 10-2012-0083209 A | 7/2012 |
| WO | 2012-138032 A1 | 10/2012 |
| WO | 2013-039348 A1 | 3/2013 |
| WO | 2013-058583 A1 | 4/2013 |
| WO | 2014089445 A1 | 6/2014 |

OTHER PUBLICATIONS

Zhang et al., (Further improvements on advanced residual prediction, JCT-3V Meeting; Jul. 27, 2013-Aug. 2, 2013; Vienna) (Year: 2013).*

L. Zhang et al., "CE4: Advanced residual prediction for multiview coding," Joint Collaborative Team on 3D Video Coding Extensions of ITU-T SG 16 WP3 and ISO/IEC JTC 1/SC 29/WG 11, JCT3V-D0177, Apr. 20-26, 2013.

T. Ikai et al., "ARP simplification," Joint Collaborative Team on 3D Video Coding Extensions of ITU-T SG 16 WP3 and ISO/IEC JTC 1/SC 29/WG 11, JCT3V-E0044 rl, Jul. 27-Aug. 2, 2013.

L. Zhang et al., "Further improvements on advanced residual prediction," Joint Collaborative Team on 3D Video Coding Extensions of ITU-T SG 16 WP3 and ISO/IEC JTC 1/SC 29/WG 11, JCT3V-E0124, Jul. 27-Aug. 2, 2013.

G. Tech et al., "3D-HEVC Draft Text 1," Joint Collaborative Team on 3D Video Coding Extensions Development of ITU-T SG 16 WP 3 and ISO/IEC JTC 1/SC 29/WG 11, JCT3V-E1001-v3, Jul. 27-Aug. 2, 2013.

I. Richardson, "Table 6.8 Examples of parameters to be encoded," The Baseline Profile, Entropy Coding, Dec. 31, 2003.

* cited by examiner

VIDEO DECODING METHOD AND APPARATUS FOR DECODING MULTI-VIEW VIDEO

This application is a U.S. National Phase Application under 35 U.S.C § 371 of International Application PCT/KR2014/009858 filed on Oct. 20, 2014, which claims the benefit of U.S. Provisional Application Nos. 61/892,452 filed Oct. 18, 2013, and 61/892,466 filed Oct. 18, 2013, the entire content of the prior applications is hereby incorporated by reference.

FIELD OF THE INVENTION

The present invention relates to a video coding technique, and, more particularly, to a 3D video image coding technique.

RELATED ART

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, 3D video using multi-views have a high correlation between views having the same picture order count POC. Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for encoding/decoding a multi-view video, and information need for encoding and/or decoding of a current view can be obtained. For example, a block to be decoded in a current view can be predicted or decoded with reference to a block in different view.

SUMMARY OF THE INVENTION

The present invention provides a method and device for efficiently producing a prediction sample for a current block in a current view using information about a different view from the current view.

The present invention provides a method and device for effectively entropy coding a current block using information about a neighboring block with the current block.

The present invention provides a method and device for entropy coding information to be employed for residual prediction for a current block, wherein the residual prediction employs information about a different view from a current view containing the current block, wherein the entropy coding is based on whether the residual prediction was applied to a neighboring block with the current block.

In one aspect, there is provided a video decoding device for decoding a multi-view video.

The device comprises an entropy decoding module for entropy decoding a bitstream wherein the entropy decoding includes decoding information about residual prediction with reference to at least one neighboring block with a current block; a memory for storing therein pictures, the pictures being referenced for decoding the current block; a prediction module for producing a prediction sample for the current block using information about the residual, wherein the prediction sample is produced based on a difference between sample values for first and second blocks respectively, the first and second blocks being corresponding to the current block and being disposed in the pictures stored in the memory respectively; and a filter for applying filtering to a current picture recovered using the prediction sample, wherein at least one of the first and second blocks is disposed in a different view from a view containing the current block, wherein the first block is defined by either a motion vector or a disparity vector for the current block, and wherein the second block is defined by both the motion vector and the disparity vector for the current block.

In another aspect, there is provided a video decoding method for decoding a multi-view video, the method comprising: entropy decoding information about residual prediction with reference to at least one neighboring block with a current block; producing a prediction sample for the current block using information about the residual, wherein the prediction sample is produced based on a difference between sample values for first and second blocks respectively, the first and second blocks being corresponding to the current block; and applying filtering to a current picture recovered using the prediction sample, wherein at least one of the first and second blocks is disposed in a different view from a view containing the current block, wherein the first block is defined by either a motion vector or a disparity vector for the current block, and wherein the second block is defined by both the motion vector and the disparity vector for the current block.

In this way, the present invention efficiently produces the prediction sample for the current block in the current view using information about the different view from the current view.

Further, the present invention effectively entropy codes the current block using information about the neighboring block with the current block.

Furthermore, the present invention effectively entropy codes information to be employed for residual prediction for the current block, wherein the residual prediction employs information about the different view from the current view, wherein the entropy coding is based on whether the residual prediction was applied to the neighboring block.

DESCRIPTION OF EXEMPLARY EMBODIMENTS

As used herein, a term "Pixel" or "pel" means a minimum unit constituting a single image. A term "Sample" may be used as a term representing a value of a specific pixel. In this connection, the sample may indicate a pixel value of a luma component and/or a pixel value of a chroma component.

As used herein, a term "Unit" means a basic unit for image processing and/or a specific position in an image. The unit may be used interchangeably with terms such as "block", "area", or the like. Generally, a M×N block refers to a set of samples or transform coefficients arranged in M columns and N rows.

Hereinafter, embodiments of the present invention will be described in details with reference to the attached drawings.

Figure 1:
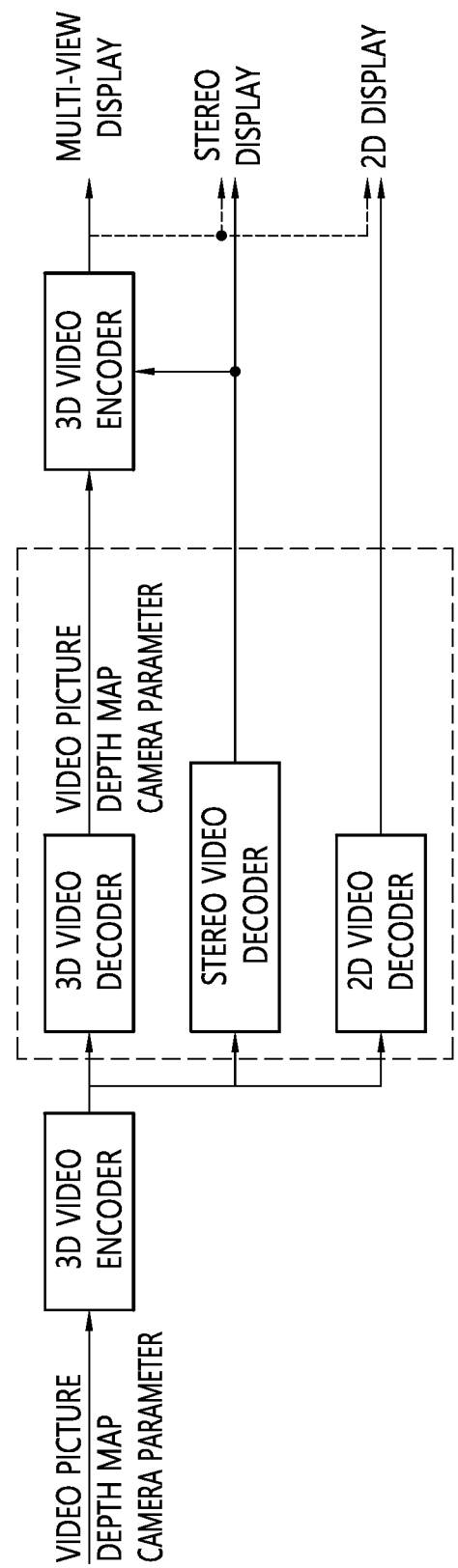
FIG. 1 schematically illustrates an encoding and decoding procedure for a 3D video.

FIG. 1 is a diagram scheduling describing encoding and decoding processes of a 3D video.

Referring to FIG. 1, a 3 video encoder encodes a video picture and a depth map and a camera parameter to output the same as a bitstream.

The depth map may be constituted by distance information (depth information) between a camera and a subject with respect to a pixel of the corresponding video picture (texture picture). For example, the depth map may be a picture acquired by normalizing the depth information according to a bit depth. In this case, the depth map may be constituted by the depth information recorded without expression of a chrominance.

In general, since a distance from the subject and a disparity are in inverse proportion to each other, disparity information indicating a correlation between views may be induced from the depth information of the depth map by using the camera parameter.

A bitstream including the depth map and camera information together with a general color picture, that is, the video picture (texture picture) may be transmitted to a decoder through a network or a storage medium.

The decoder receives the bitstream to reconstruct the video. When a 3D video decoder is used as the decoder, the 3D video decoder may decode the video picture, and the depth map and the camera parameter from the bitstream. Views required for a multi-view display may be synthesized based on the decoded video picture, depth map, and camera parameter. In this case, when the used display is a stereo display, the 3D picture may be displayed by using two pictures among the reconstructed multi-views.

When the stereo video decoder is used, the stereo video decoder may reconstruct two pictures to be incident in both eyes from the bitstream. The stereo display may display a 3D picture by using a view difference or disparity between a left picture incident in a left eye and a right picture incident in a right eye. When the multi-view display is used together with the stereo video decoder, the multi-views may be displayed by generating other views based on the two reconstructed pictures.

When a 2D decoder is used, a 2D picture is reconstructed to output the picture through a 2D display. The 2D display is used, but when the 3D video decoder or the stereo video decoder is used as the decoder, one of the reconstructed pictures may be output through the 2D display.

In the configuration of FIG. 1, the view synthesis may be performed by the decoder or the display. Further, the decoder and the display may be one apparatus or separate apparatuses.

In FIG. 1, for easy description, it is described that the 3D video decoder, the stereo video decoder, and the 2D video decoder are separate decoders, but one decoding apparatus may perform all 3D video decoding, stereo video decoding, and 2D video decoding. Further, a 3D video decoding apparatus may perform the 3D video decoding, a stereo video decoding apparatus may perform the stereo video decoding, and a 2D video decoding apparatus may perform the 2D video decoding. Furthermore, the multi-view display may output a 2D video or a stereo video.

Figure 2:
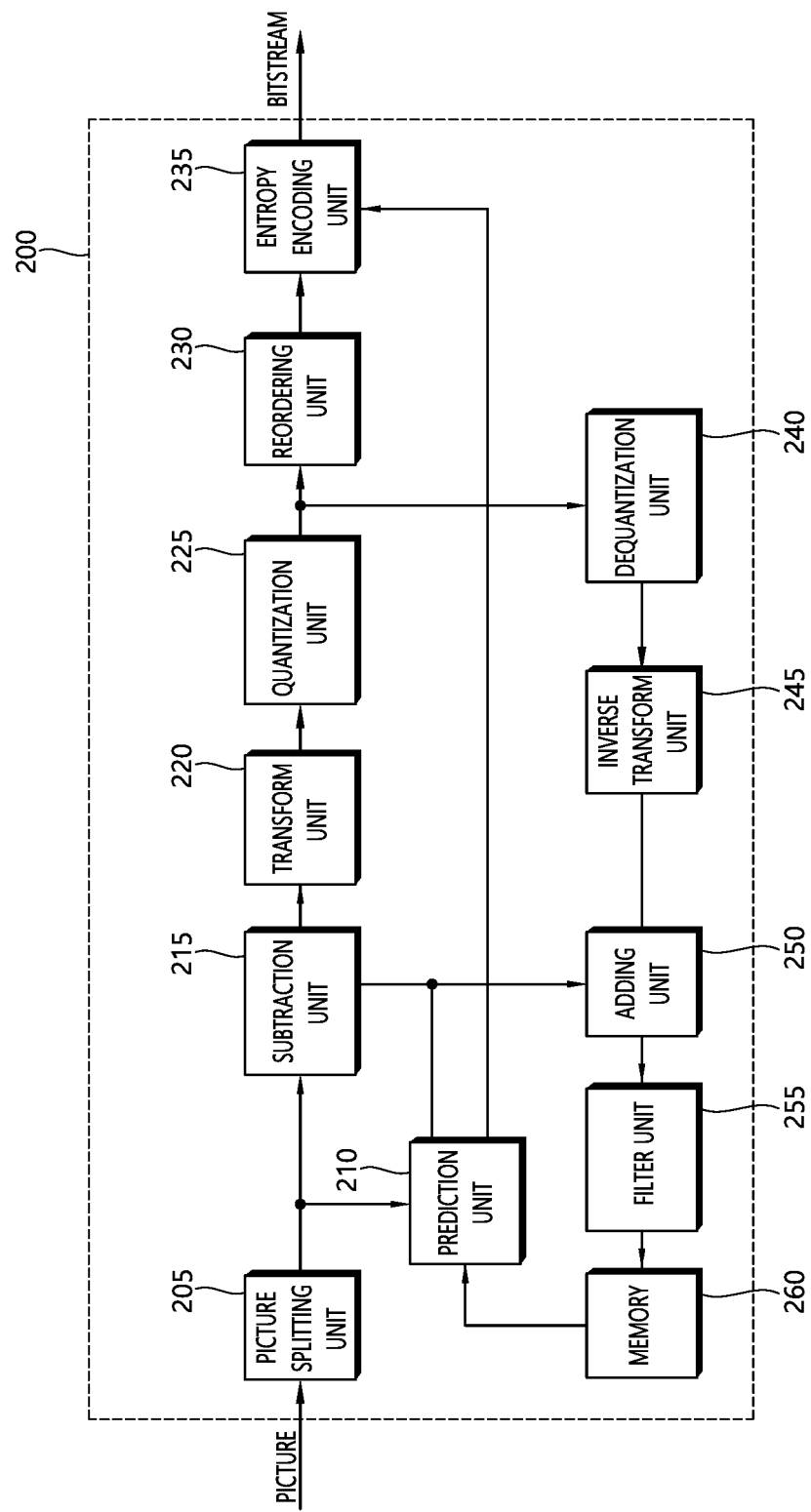
FIG. 2 schematically illustrates a configuration of a video encoding device.

FIG. 2 is a diagram schematically describing a configuration of a video encoding apparatus. Referring to FIG. 2, the video encoding apparatus 200 includes a picture splitting unit 205, a prediction unit 210, a subtraction unit 215, a transform unit 220, a quantization unit 225, a reordering unit 230, an entropy encoding unit 235, an dequantization unit 240, an inverse transform unit 245, an adding unit 250, a filter unit 255, and a memory 260.

The picture splitting unit 05 may split an input picture into at least one processing unit block. In this case, the processing unit block may be a coding unit block, a prediction unit block, or a transform unit block. The coding unit block as a unit block of coding may be split from a maximum coding unit block according to a quad tree structure. The prediction unit block as a block partitioned from the coding unit block may be a unit block of sample prediction. In this case, the prediction unit block may be divided into sub blocks. The transform unit bock as the coding unit block may be split according to the quad tree structure and may be a unit block to induce a transform coefficient or a unit block to induce a residual signal from the transform coefficient.

As used herein, for the sake of convenience of illustration, a coding unit block is referred to as a coding block or a coding unit (CU). A prediction unit block is referred to as a prediction block or a prediction unit (PU). A transform unit block is referred to as a transform block or a transform unit (TU).

The prediction block or the prediction unit may mean a block-shape specific area or an array of the prediction sample. Further, the transformation block or the transform unit may mean the block-shape specific area or an array of the transform coefficient or a residual sample.

The prediction unit 210 may perform a prediction for a processing target block (hereinafter, referred to as a current block) and generate the prediction block including prediction samples for the current block. A unit of the prediction performed by the prediction unit 210 may be the coding block, the transformation block, or the prediction block.

The prediction unit 210 may decide whether an intra prediction is applied to the current block or whether an inter prediction is applied to the current block.

In the case of the intra prediction, the prediction unit 210 may induce the prediction sample for the current block based on a neighbor block pixel in a picture (hereinafter, a current picture) to which the current block belongs. In this case, the prediction unit 210 may (i) induce the prediction sample based an average or an interpolation of neighbor reference samples of the current block or (ii) induce the prediction sample based on a reference sample which is present in a specific direction with respect to a prediction target pixel among neighbor blocks of the current block. For easy description, the case of (i) is referred to as a non-directional mode and the case of (ii) is referred to as a directional mode. The prediction unit 210 may decide a prediction mode applied to the current block by using the prediction mode applied to the neighbor block.

In the case of the inter prediction, the prediction unit 210 may induce the prediction sample for the current block based on samples specified by a motion vector on a collocated picture. The prediction unit 10 applies any one of a skip mode, a merge mode, and an MVP mode to induce the prediction sample for the current block. In the cases of the skip mode and the merge mode, the prediction unit 210 may use motion information of the neighbor block as the motion information of the current block. In the case of the skip mode, a difference (residual) between the prediction sample and an original sample is not transmitted unlike the merge mode. In the case of the MVP mode, the motion vector of the neighbor block is used as a motion vector predictor (MVP) to induce the motion vector of the current block.

In the case of the inter prediction, the neighbor block includes a spatial neighbor block which is present in the current picture and a spatial neighbor block which is present in the collocated picture. The motion information includes the motion vector and the collocated picture. In the skip mode and the merge mode, when the motion information of the spatial neighbor block is used, a highest picture on a collocated picture list may be used as the collocated picture.

In the case of encoding a dependent view, the prediction unit 210 may perform an inter-view prediction.

The prediction unit 210 may configure the collocated picture list including a picture of another view. For the inter-view prediction, the prediction unit 210 may induce a disparity vector. Unlike a motion vector specifying a block corresponding to the current block in another picture in a current view, the disparity vector may specify a block corresponding to the current block in another view of the same access unit as the current picture.

The prediction unit 210 may specify a depth block in a depth view based on the disparity vector and perform a configuration of a merge list, an inter-view motion prediction, an illumination compensation (IC), view synthesis, and the like.

The disparity vector for the current block may be induced from a depth value by using the camera parameter or induced from the motion vector or disparity vector of the neighbor block in the current or another view.

For example, the prediction unit 210 may add to a merge candidate list an inter-view merging candidate (IvMC) corresponding to spatial motion information of a reference view, an inter-view disparity vector candidate (IvDC) corresponding to the disparity vector, a shifted IvMC induced by a shift of the disparity, a texture merging candidate (T) induced from a texture corresponding to a case in which the current block is a block on the depth map, a disparity derived merging candidate (D) derived from the texture merging candidate by using the disparity, a view synthesis prediction merge candidate (VSP) derived based on the view synthesis, and the like.

In this case, the number of candidates included in a merge candidate list applied to the dependent view may be limited to a predetermined value.

Further, the prediction unit 210 may predict the motion vector of the current block based on the disparity vector by applying the inter-view motion vector prediction. In this case, the prediction unit 210 may derive the disparity vector based on conversion of a maximum depth value in the corresponding depth block. When a position of the reference sample in the reference view is specified by adding the disparity vector to a sample position of the current block in the reference view, a block including the reference sample may be used as the reference block. The prediction unit 210 may use the motion vector of the reference block as a candidate motion parameter or a motion vector predictor candidate of the current block and use the disparity vector as a candidate disparity vector for the DCP.

The subtraction unit 215 generates the residual sample which is the difference between the original sample and the prediction sample. When the skip mode is applied, the subtraction unit 215 may not generate the residual sample as described above.

The transform unit 210 generates the transform coefficient by using transforming the residual sample by the unit of the transform block. The quantization unit 225 quantizes the transform coefficients to generate quantized transform coefficients.

The reordering unit 230 reorders the quantized transform coefficients. The reordering unit 230 may reorder the block-shape quantized transform coefficients in a 1D vector shape through a scanning method.

The entropy encoding unit 235 may perform entropy-encoding of the quantized transform coefficients. As the entropy encoding, encoding methods including, for example, exponential Golomb, context-adaptive variable length coding (CAVLC), context-adaptive binary arithmetic coding (CABAC), and the like may be used. The entropy encoding unit 235 may encode information (e.g., a value of a syntax element, and the like) required for video reconstruction together or separately in addition to the quantized transform coefficients.

The entropy-encoded information may be transmitted or stored by the unit of a network abstraction layer as the form of the bitstream.

The dequantization unit 240 dequantizes the quantized transform coefficient to generate the transform coefficient. The inverse transform unit 245 inversely transforms the transform coefficient to generate the residual sample.

The adding unit 250 adds the residual sample and the prediction sample to reconstruct the picture. The residual sample and the prediction sample are added to each other by the unit of the block to generate a reconstruction block. Herein, the adding unit 250 is described as a separate component, but the adding unit 250 may be a part of the prediction unit 210.

The filter unit 255 may apply a deblocking filter and/or offset to the reconstructed picture. Distortion during an artifact or a quantization process of a block boundary in the reconstructed picture may be corrected through the deblocking filtering and/or offset. The offset may be applied by the unit of the sample and applied after the process of the deblocking filtering is completed.

The memory 260 may store the reconstructed picture or information required for encoding/decoding. For example, the memory 60 may store pictures used for the inter prediction/inter-view prediction. In this case, the pictures used for the inter prediction/inter-view prediction may be designated by a collocated picture set or a collocated picture list.

Herein, it is described that one encoding apparatus encodes an independent view or the dependent view, but this is for easy description and a separate encoding apparatus is configured for each view or a separate internal module (for example, a prediction unit for each view) may be configured for each view.

Figure 3:
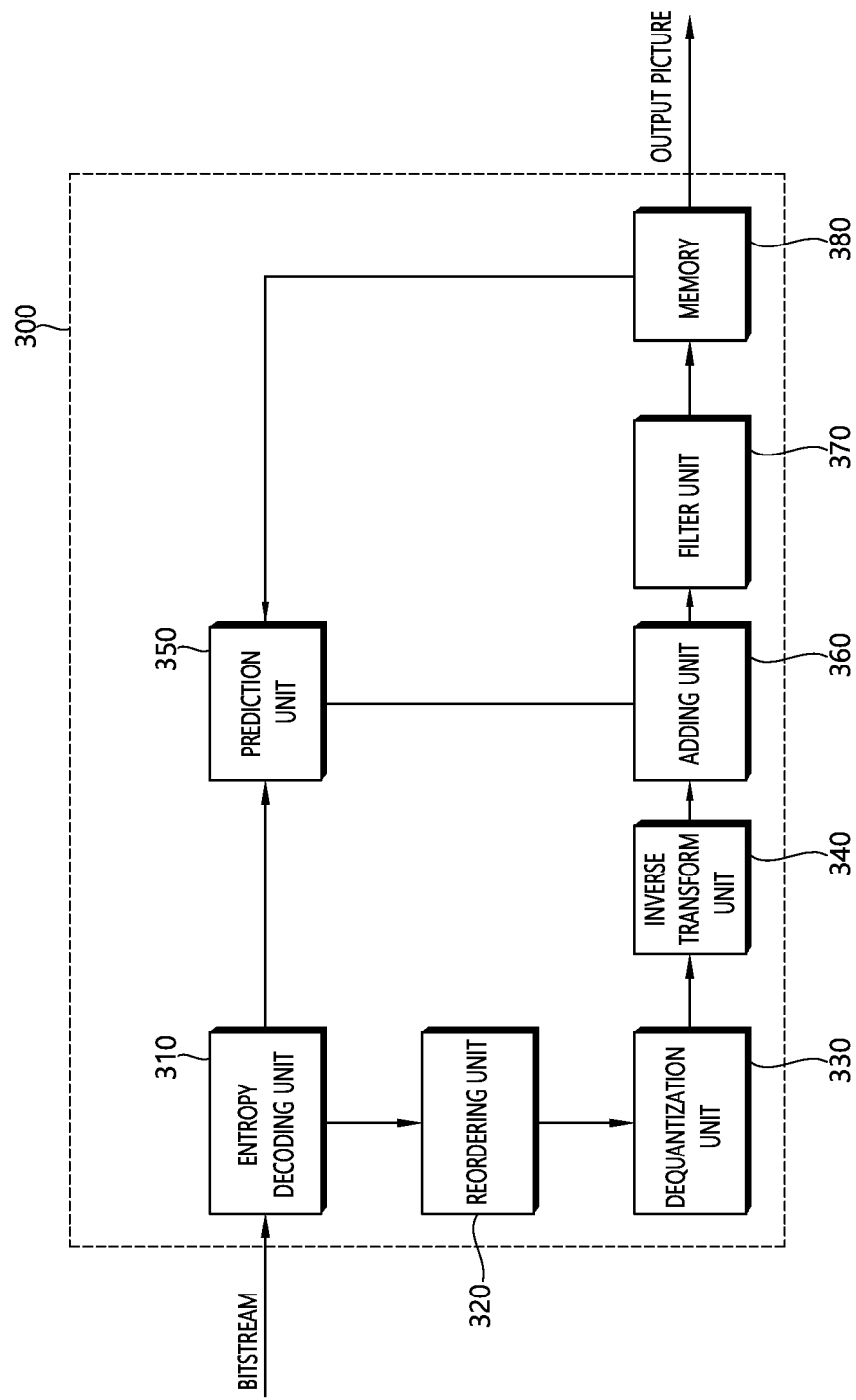
FIG. 3 schematically illustrates a configuration of a video decoding device.

FIG. 3 is a diagram schematically describing a configuration of a video decoding apparatus. Referring to FIG. 3, the video decoding apparatus 300 includes an entropy decoding unit 310, a reordering unit 320, a dequantization unit 330, an inverse transform unit 340, a prediction unit 350, an adding unit 360, a filter unit 370, and a memory 380.

When a bitstream including video information is input, the video decoding apparatus 300 may reconstruct a video to correspond to a process in which the video information is processed by the video encoding apparatus.

For example, the video decoding apparatus 300 may perform video decoding by using the processing unit applied in the video encoding apparatus. In this case, the processing unit block of the video decoding may be the coding unit block, the prediction unit block, or the transform unit block. The coding unit block as a unit block of decoding may be split from the maximum coding unit block according to the quad tree structure. The prediction unit block as the block partitioned from the coding unit block may be the unit block of sample prediction. In this case, the prediction unit block may be divided into sub blocks. The transform unit bock as the coding unit block may be split according to the quad tree structure and may be a unit block to derive a transform coefficient or a unit block to derive a residual signal from the transform coefficient.

The entropy decoding module 310 may parse a bitstream and output information required to recover a video or picture. For example, the entropy decoding module 310 may decode information in the bitstream based on an expotential-Golomb, CAVLC, CABAC, etc., and output a syntax element value for video recovery, a quantized value of a transform coefficient for a residual. In this regard, the entropy decoding module 310 may entropy decode information about a current block with reference to a neighboring block with the current block.

When a plurality of views is processed in order to reproduce the 3D video, the bitstream may be input for each view. Alternatively, information on the respective views may be multiplexed in the bitstream. In this case, the entropy decoding unit 310 de-multiplexes the bitstream to parse the de-multiplexed bitstream for each view.

The reordering unit 320 may reorder the quantized transform coefficients in the 2D block form. The reordering unit 320 may perform reordering to correspond to coefficient scanning performed by the encoding apparatus.

The dequantization unit 330 dequantizes the quantized transform coefficients based on (de)quantized parameters to output the transform coefficients. Information for deriving the quantized parameters may be signaled from the encoding apparatus.

The inverse transform unit 340 inversely transforms the transform coefficients to derive the residual samples.

The prediction unit 350 may perform a prediction for the current block and generate the prediction block including prediction samples for the current block. A unit of the prediction performed by the prediction unit 350 may be the coding block, the transformation block, or the prediction block.

The prediction unit 350 may decide whether the intra prediction is applied to the current block or whether the inter prediction is applied to the current block. In this case, a unit for deciding which the intra prediction or the inter prediction is applied and a unit for generating the prediction sample may be different from each other. Moreover, the units for generating the prediction sample in the inter prediction and the intra prediction may also be different from each other.

In the case of the intra prediction, the prediction unit 350 may derive the prediction sample for the current block based on the neighbor block pixel in the current picture. The prediction unit 350 may derive the prediction sample for the current block by applying the directional mode or the non-directional mode based on neighbor reference blocks of the current block. In this case, the prediction mode to be applied to the current block may be decided by using an intra prediction mode of the neighbor block.

In the case of the inter prediction, the prediction unit 350 may derive the prediction sample for the current block based on the samples specified by the motion vector on the collocated picture. The prediction unit 10 applies any one of the skip mode, the merge mode, and the MVP mode to derive the prediction sample for the current block.

In the cases of the skip mode and the merge mode, the prediction unit 350 may use the motion information of the neighbor block as the motion information of the current block. In this case, the neighbor block may include a spatial neighbor block and a temporal neighbor block.

The prediction unit 350 may configure the merge candidate list as motion information of an available neighbor block and information indicated by a merge index on the merge candidate list may be used as the motion vector of the current block. The merge index may be signaled from the encoding apparatus. The motion information includes the motion vector and the collocated picture. In the skip mode and the merge mode, when the motion information of the temporal neighbor block is used, the highest picture on the collocated picture list may be used as the collocated picture.

In the case of the skip mode, the difference (residual) between the prediction sample and the original sample is not transmitted unlike the merge mode.

In the case of the MVP mode, the motion vector of the neighbor block is used as the motion vector predictor (MVP) to derive the motion vector of the current block. In this case, the neighbor block may include the spatial neighbor block and the temporal neighbor block.

In the case of encoding the dependent view, the prediction unit 350 may perform the inter-view prediction. In this case, the prediction unit 350 may configure the collocated picture list including the picture of another view.

For the inter-view prediction, the prediction unit 350 may derive the disparity vector. The prediction unit 350 may specify the depth block in the depth view based on the disparity vector and perform the configuration of the merge list, the inter-view motion prediction, the illumination compensation (IC), the view synthesis, and the like.

The disparity vector for the current block may be derived from the depth value by using the camera parameter or derived from the motion vector or disparity vector of the neighbor block in the current or another view. The camera parameter may be signaled from the encoding apparatus.

When the merge mode is applied to the current block of the dependent view, the prediction unit 350 may add to the merge candidate list IvDC corresponding to the temporal motion information of the reference view, IvDC corresponding to the disparity vector, shift IvMC derived by the shift of the disparity vector, the texture merge candidate (T), derived from the texture corresponding to the case in which the current block is the block on the depth map, the disparity derive merge candidate (D) derived from the texture merge candidate by using the disparity, the view synthesis prediction merge candidate (VSP) derived based on the view synthesis, and the like.

In this case, the number of candidates included in the merge candidate list applied to the dependent view may be limited to a predetermined value.

Further, the prediction unit 350 may predict the motion vector of the current block based on the disparity vector by applying the inter-view motion vector prediction. In this case, the prediction unit 350 may use the block in the reference view specified by the disparity vector as the reference block. The prediction unit 350 may use the motion vector of the reference block as the candidate motion parameter or the motion vector predictor candidate of the current block and use the disparity vector as the candidate disparity vector for the DCP.

The adding unit 360 adds the residual sample and the prediction sample to reconstruct the current block or the current picture. The adding unit 360 adds the residual sample and the prediction sample by the unit of the block to reconstruct the current picture. When the skip mode is applied, since the residual is not transmitted, the prediction sample may become a reconstruction sample. Herein, the adding unit 360 is described as a separate component, but the adding unit 360 may be a part of the prediction unit 350.

The filter unit 370 may apply the deblocking filtering and/or offset to the reconstructed picture. In this case, the offset may be adaptively applied as the offset of the sample unit.

The memory 380 may store the reconstructed picture or information required for decoding. For example, the memory 380 may store pictures used for the inter prediction/inter-view prediction. In this case, the pictures used for the inter prediction/inter-view prediction may be designated by the collocated picture set or the collocated picture list. The reconstructed picture may be used as the collocated picture.

Further, the memory 380 may output the reconstructed pictures according to an output order. In order to reproduce the 3D picture, although not illustrated, an output unit may display a plurality of different views.

In the example of FIG. 3, it is described that one decoding apparatus decodes the independent view and the dependent view, but this is for easy description and the present invention is not limited thereto. For example, each decoding apparatus may operate for each view and one decoding apparatus may include an operating unit (for example, a prediction unit) corresponding to each view therein.

When coding a multi-view video, encoding and decoding devices may improve efficiency of video coding for a current view, using coded data for different view belonging to the same access unit (AU) as a current picture. In this connection, pictures having an equal POC (Picture Order Count) may define a single AU. The POC refers to a display order of a certain picture.

The encoding and decoding devices may code views on an AU unit basis, and/or may code pictures on a view unit basis. The coding may proceed for the views based on a predetermined order. A view to be coded first may be referred to as a base view or independent view. A view to be coded with reference to different view after coding the independent view may be referred to as a dependent view. Further, when a current view is a dependent view, different view to be referenced for coding (encoding/decoding) of the current view may be referred to as a reference view.

Figure 4:
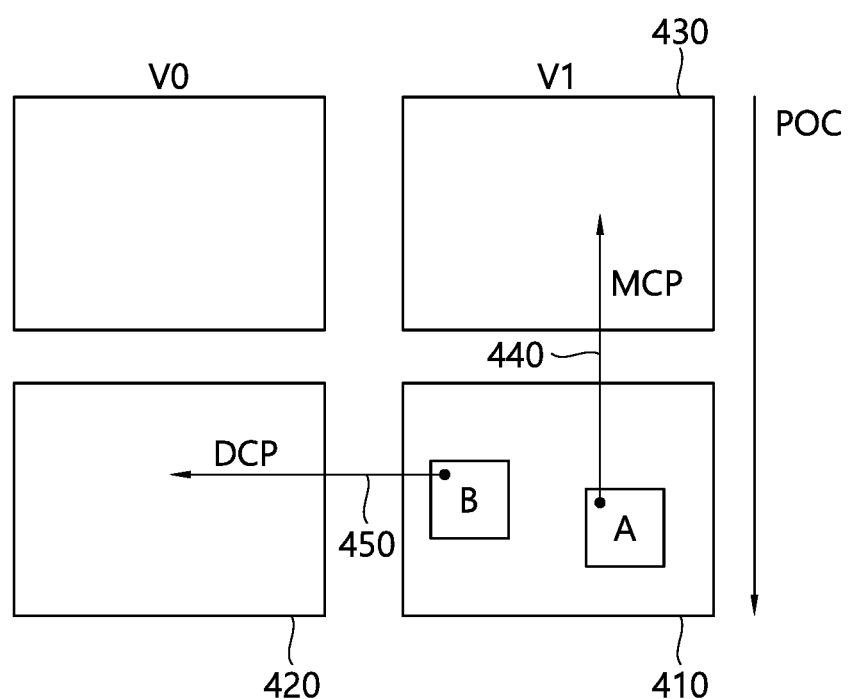
FIG. 4 schematically illustrates an inter-view coding method.

FIG. 4 schematically illustrates an inter-view coding method. In an example of FIG. 4, coding is performed on an AU unit basis, and V0 is an independent view, and V1 is a dependent view. Inter picture prediction may be carried out, for example, for a block A in a current picture 410 with reference to another picture 430 in the same view as the current picture 410 by using a motion vector 440. Such inter picture prediction may be referred to as motion-compensated prediction (MCP). In an alternative, inter picture prediction may be carried out, for example, for a block B in the current picture 410 with reference to a picture 420 in a different view from the current picture 410 but existing in the same access unit, that is, having the same POC as the current picture 410 by using a disparity vector 450. Such inter picture prediction may be referred to as disparity-compensated prediction (DCP).

When coding a multi-view video, the inter picture prediction may employ a depth map besides the picture in the different view from the current view containing the current block.

Figure 5:
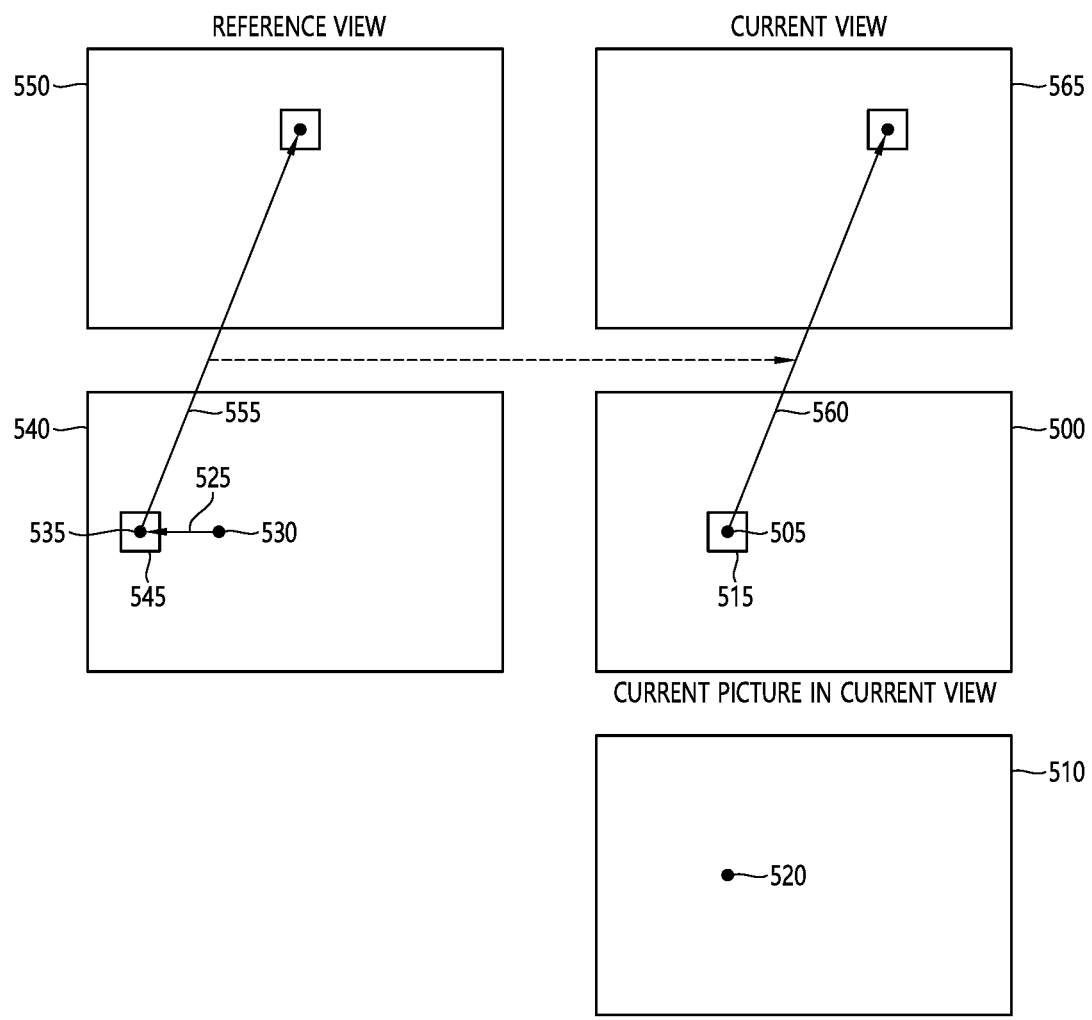
FIG. 5 schematically illustrates a multi-view coding method using a depth map.

FIG. 5 schematically illustrates a multi-view coding method using a depth.

Referring to FIG. 5, a block (current block 505) in a current picture 500 in a current view may be coded (encoded/decoded) using a depth map 510. In this connection, a depth value d for a position (x, y) of a sample 520 in the depth map 510 corresponding to a position (x, y) of a sample 515 in the current block 505 may be transformed to a disparity vector 525. The depth value d may be derived based on a distance between the sample pixel and a camera.

Encoding and decoding devices may add a disparity vector 525 to the position (x, y) of the sample 530, thereby to determine a position of a reference sample 535 in a current picture 540 in a reference view. The disparity vector may have only a x axial component. Therefore, the disparity vector value may be a value (disp, 0). Thus, the position (xr, y) of the reference sample 540 may be determined to be a position (x+disp, y).

Encoding and decoding devices may employ a motion parameter for the reference block 545 including a reference pixel 535 as a candidate motion parameter for the current block. For example, when a reference picture 550 in the reference view is a reference picture for the reference block 545, the motion vector 555 for the reference block 545 may be derived from a motion vector 560 for the current block 505. In this connection, a picture 565 may be a reference picture in the current view.

Encoding and decoding devices may perform a residual prediction for a MCP block in a dependent view. As used herein, for the sake of convenience of illustration, it may be assumed that the residual prediction is performed by respective prediction modules in the encoding and/or decoding devices.

The prediction module may predict a residual for a current block using a motion vector predicted for a block in a reference view corresponding to the current block.

Figure 6:
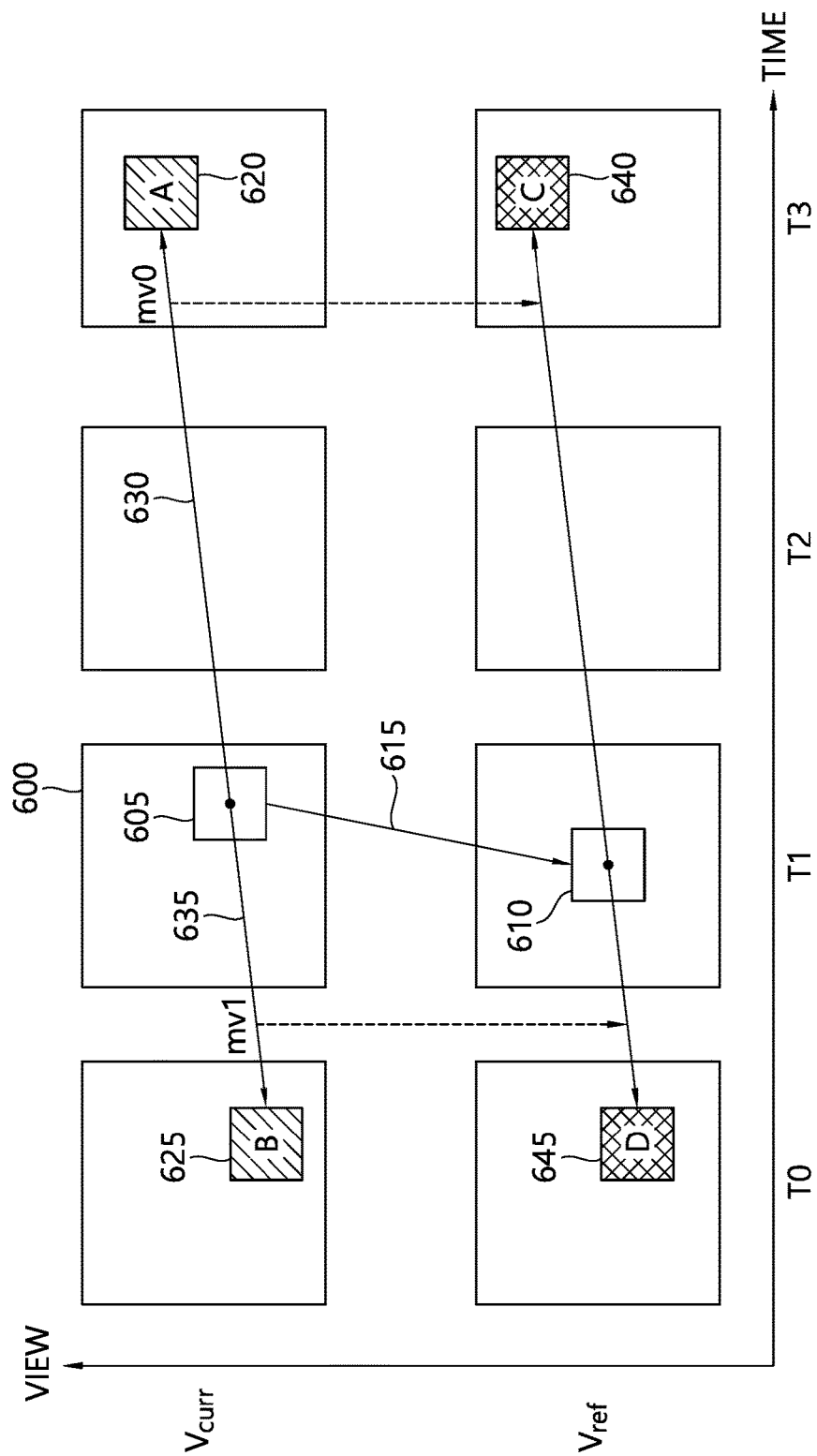
FIG. 6 schematically illustrates residual prediction in accordance with the present invention.

FIG. 6 schematically illustrates residual prediction in accordance with the present invention.

When predicting a residual sample for a current block 605 in a current picture 600, the prediction module may specify a position of a block 610 in a reference view Vref corresponding to the current block 605 using a disparity vector 615. When performing inter prediction for the current block 605 within the current view, a block A 620 may be referenced in a L0 direction, and a block B 625 may be referenced in a L1 direction. The block A 620 may be specified using a motion vector mv0 630, and the block B 625 may be specified using a motion vector mv1 635.

The prediction module may specify a reference block C 640 for a corresponding block 610 to the current block 605 in the reference view using the motion vector mv0. The prediction module may specify a reference block D 645 for a corresponding block 620 to the current block 605 in the reference view using the motion vector mv1. In this connection, a POC of a picture containing the reference block C 640 and a POC of a picture containing the reference block A 620 may be equal to each other. Further, a POC of a picture containing the reference block d 645 and a POC of a picture containing the reference block B 625 may be equal to each other.

The inter-view residual prediction may be applied only to a specific prediction direction based on a complexity. For example, although in FIG. 6, both the motion vector mv0 having the L0 direction and the motion vector mv1 having the L1 direction are employed. The present invention is not limited thereto. In one embodiment, only the motion vector mv0 having the L0 direction may be employed.

Hereinafter, for the sake of convenience of illustration, it will be assumed that inter-view residual prediction is carried out using only the motion vector mv0 having the L0 direction in the current view.

The inter-view residual prediction may include (1) prediction using the reference block 620 in the same view as the current block 605, and (2) prediction using the reference block 610 in the different view from the current block 605.

When a prediction sample for the current block 605 is derived with reference to the reference block 620, the prediction module may modify the prediction sample for the current block 605 using a difference value between a sample value for the corresponding block 610 and a sample value for the reference block 640 in the reference view vref. In this connection, the sample values of the blocks may be sample values of prediction samples for the blocks respectively.

When the prediction sample for the current block 605 is derived with reference to the corresponding block 610 in the reference view, the prediction module may modify the prediction sample for the current block 605 using a difference value between a sample value for the reference block A 620 in the current view and a sample value for the reference block C 640 in the reference view vref. In this connection, the sample values of the blocks may be sample values of prediction samples for the blocks respectively.

As described above, when the corresponding picture in the reference view is referenced for the inter prediction for the current block, residual prediction may employ the reference picture in the same view as the current block, and the reference picture for the corresponding picture. In this connection, a first block in the reference picture in the same view as the current block may be specified using the motion vector. Further, a second block in the reference picture for the corresponding picture in the different view from the current block may be specified using a combination of the disparity vector and motion vector. Furthermore, the prediction sample for the current block may be modified using a difference between sample values for the first and second blocks.

When the inter prediction for the current block employs the reference picture in the same view as the current block, residual prediction may employ the corresponding picture in the reference view, and the reference picture for the corresponding picture. In this connection, a first block in the corresponding picture in the reference view may be specified using the disparity vector. Further, a second block in the reference picture for the corresponding picture may be specified using a combination of the disparity vector and motion vector. Furthermore, the prediction sample for the current block may be modified using a difference between sample values for the first and second blocks.

The prediction sample for the current block 605 may be modified by adding a value resulting from application of a predetermined weighting factor to the difference value. The difference value may be referred to as an inter-view residual in that the difference value is obtained for the samples in the different views respectively.

The prediction module or adding module may produce a recovery sample for the current block based on the modified prediction sample. For example, the prediction module or adding module may produce the recovery sample for the current block by adding a residual sample for the current block to the modified prediction sample.

A weighting factor to be applied to the produced inter-view residual sample may be one of 0, 0.5, or 1. The weighting factor 0 may indicate that the residual prediction is not applied. Index information indicating which weighting factor will be applied may be sent on a block unit basis.

The inter-view residual prediction may not be applied when the motion vector is not necessary, for example, for a DCP block or intra mode block.

Beside the above-described inter-view residual prediction, a variety of methods may be used for recovering the current view with reference to the different view in the multi-view video coding. For example, view synthesis prediction (VSP) may be used which synthesizes the current view using a reference video and a depth. In another approach, the current view may be decoded using characteristics about a depth view. However, when the current view is decoded using the different view, prediction performance for the current view may be deteriorated since the views have different characteristics due to different characteristics about illuminations and/or cameras employed for acquiring the views. Thus, for the multi-view coding, in order to improve prediction precision, there is a need for compensating the difference between the views characteristics. This compensation may be referred to as inter-view mismatch compensation (IVMC). A representative example of the IVMC may be illumination compensation (IC).

Figure 7:
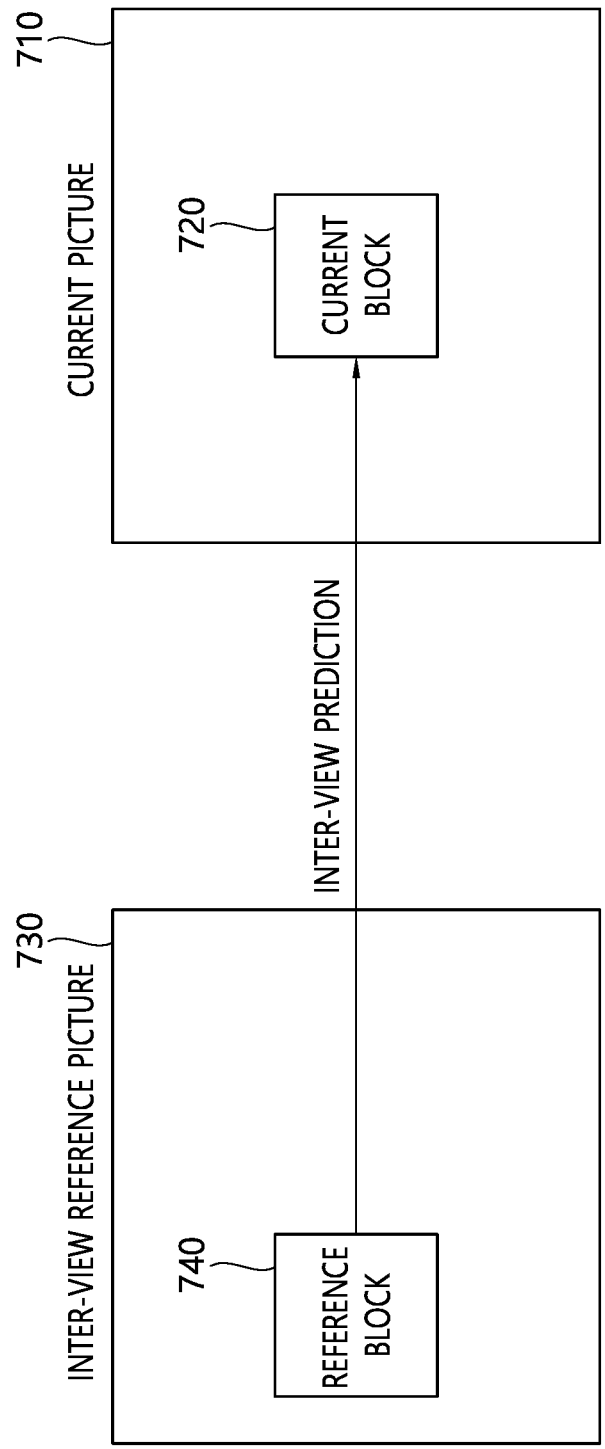
FIG. 7 schematically illustrates inter-view mismatch compensation (IVMC).

FIG. 7 schematically illustrates IVMC. It may be considered that, as shown in FIG. 7, a current block 720 in a current picture 710 is coded (encoded/decoded). In this connection, the current block 720 may be a prediction block. When applying inter-view prediction, a reference block 740 in an inter-view reference picture 730 may be referenced.

In this connection, the current picture 710 and reference picture 730 in the different views respectively may be imaged using different cameras. As described above, the cameras may have different imaging conditions, setting, etc., leading to a mismatch between the views acquired using the cameras.

The prediction with compensation for the mismatch may provide more reliable inter-view prediction. In this connection, the inter-view prediction may include synthesizing a virtual view based on a depth map.

For a 3D video coding, a method for compensating for the mismatch between the views has been studied.

For example, as in equation 1, compensation for prediction and reference for a current PU may be performed with consideration of characteristics about neighbouring pixels with a current block (for example, CU), and an inter-view reference block:

$$P(i,j)=a*R(i+dv,j+dv)+b \qquad \text{<equation 1>}$$

At the above equation 1, a sample position (i,j) is a position of a sample in the current PU, R is a reference sample for an inter-view reference block specified by a disparity vector dv. The coefficients a and b are predetermined linear coefficients for the compensation.

However, the above IVMC approaches may deteriorate coding performance when a pixel values spread between the inter-view pictures is small (for example, in a sequence created by a computer). Thus, information may be signalled in a slider header, which indicates whether to perform the compensation based on a pixel values spread between the inter-view reference picture and a current picture to be coded Although there may be several approaches for calculating the pixel values spread, in on exemplary approach, a sum of absolute differences (SAD) for two histograms may be calculated. This approach may be carried out as follows:

(1) An encoder may create a histogram indicating a pixel value spread between the current picture and inter-view reference picture. The histogram may indicate how frequently a predetermined pixel value appears in each picture.

(2) The encoder may calculate a difference value between two histograms for each pixel and, then, a sum of the differences for the pixels. That is, the SAD for the histograms is obtained.

(3) When the SAD for the histograms exceeds a predetermined threshold value, the encoder may set a flag value to 1 and compensate for the pixel value spread, wherein the flag indicates whether to perform the compensation. When the SAD for the histograms equal to or below the predetermined threshold value, the encoder may set the flag value to 0 and, thus, may not compensate for the pixel value spread.

In addition to the steps (1) to (3), for more efficient signaling, the encoder may store the flag information into APS (Adaptive Parameter Set), and send the flag value only when the flag value varies such the value is applied on a slice basis.

In this connection, a decoder may compensate for a pixel value spread based on the flag information from the encoder.

As described above, in order to efficiently control the residual prediction or IVMC, etc., the encoder may send associated information to the decoder. The signalling of the video information may be delivered over a network, or using a recording medium, etc.

The information delivered from the encoder to the decoder may be entropy coded (entropy encoded/entropy decoded). The video information may be entropy encoded which may be sent to the decoder in a bitstream. The decoding device may entropy decode the bitstream to acquire the information. For the entropy coding for the video information, CABAC (Contex-based Adaptive Binary Arithmetic Code) may be employed.

When the video information is sent in a form of a syntax element syntax value, an entropy decoding module may binarize the input value which may be outputted as a bin string. As used herein, the bin string may refer to a binary sequence or binary code formed of one or more bins. The bin may refer to each place value 0 or 1 in the binary sequence or binary code which represents a symbol and/or syntax element value via a binarization.

The binarization method may vary depending on the syntax elements. The binarization method to be applied to the syntax element may include, for example, an unary binarization, a truncated unary binarization, a truncated rice binarization, an Exp-Golomb binarization, and a fixed-length binarization, etc.

The binarized signal (bin string) may be configured such that whether to perform arithmetic coding or bypass coding for each bin is determined.

When performing the arithmetic coding, a context reflecting a probability value may be allocated to a bin to be decoded. Then, the bin may be subjected to entropy coding (entropy encoding/entropy decoding) based on the allocated context. After completion of the entropy coding for each bin, the context may be updated.

Each bin in an encoded syntax element, that is, in a bin stream of syntax element values may be indexed using a bin index binIdx. An entropy decoding module may produce a context index ctxIdx for each bin. A probability to be applied to the bin, that is, the context index ctxIdc to indicate a context model may be produced using a context index offset, ctxIdxOffset and a context index increment ctxIdc.

The entropy decoding module may set the offset value ctxIdxOffset such that different contexts are to be applied based on slice types (I slice, P slice or B slice).

The entropy decoding module may determine the context index increment ctxIdc for each bin index. For example, the entropy decoding module may determine the context index increments ctxIdc based on a predetermined "context table".

The entropy decoding module may produce the context index for a corresponding bin by adding the context index increment to the context index offset. The entropy decoding module may produce a probability variable pStateIdx based on the produced context index. The probability variable may be determined using an initial value initValue indicated by the context index from a context index table formed for each syntax element. The entropy decoding module may determine a state value valMps with a high occurrence probability based on the probability variable for decoding of the corresponding bin.

When the bypass coding is performed for each bin, steps for allocating and updating the context to the bin may be bypassed. For example, in the bypass mode, an uniform probability spread may be applied for the coding.

After completion of decoding of the bins for the syntax element, the entropy decoding module may determine a binary code as the syntax element value, wherein the binary code is formed of a combination of decoded bins and maps with a specific syntax element. When applying the inter-view residual prediction, information about whether the residual prediction is able to be applied at a slice header, picture, sequence or video level, that is, information about whether the residual prediction is to be applied. In this way, the residual prediction may be controlled at a higher level than the block unit. Hereinafter, for the sake of convenience of illustration, the inter-view residual prediction may be referred to as ARP (Advanced Residual Prediction) if true.

When applying the ARP, information indicating whether the residual prediction was applied, information indicating whether the weighting factor index was employed, information about an index indicating which weighting factor was applied, etc. may be sent on a block basis. The block, that is, a basic sending unit may be a prediction block. In an alternative, the block, that is, a basic sending unit may be a prediction block. The information about whether the weighting factor index was employed may be sent using a flag.

When it is configured that the residual prediction is applied to a current slice, for the current block to indicate whether the prediction was based on the residual prediction, a flag indicating whether the residual prediction is applied on a block unit basis, a flag indicating whether the weighting factor is applied, and/or a weighting factor index may be sent.

When the current block is encoded based on a motion vector prediction, information indicating whether a referenced reference picture list is L0 or L1, and a reference picture index in the reference picture list may be sent.

In this connection, when the reference picture index indicates the inter-view image, the encoding device may not send an ARP (Advanced Residual prediction) flag indicating whether the residual prediction is applied, and the weighting factor index. In this case, the decoding device may omit parsing the ARP flag and weighting factor index for the current block.

When the current block is encoded based on the inter prediction, especially, when the current block is encoded using a merge mode, and when a top candidate from a merge candidate list is employed, that is, only when the merge index is 0, the encoding device may send the ARP flag and the decoding device may parse the ARP flag. When the merge mode is applied to the current block, but the merge index is above 0, the ARP flag and weighting factor index may be derived and used from the merge candidate block.

Specifically, in order to apply the residual prediction, the encoding device may encode two syntax element values which may be sent to the decoding device. In this connection, sending information to the decoding device may include not only sending the information to the decoding device over a network, but also storing the information into a storage medium which may be delivered to the decoding device.

The two syntax elements, that is, information elements used to perform the residual prediction may refer respectively to an ARP flag iv_res_pred_flag and a weighting factor index iv_res_pred_weight_idx. The ARP flag iv_res_pred_flag may indicate whether the residual prediction is able to be applied to the current block. When the residual prediction is able to be applied to the current block, the weighting factor index iv_res_pred_weight_idx may be employed for the residual prediction.

The encoding device may encode the flag iv_res_pred_flag value, and the index iv_res_pred_weight_idx value which, in turn, may be delivered to the decoding device.

As described above, the flag iv_res_pred_flag may indicate whether the inter-view residual prediction is employed for decoding. When the flag iv_res_pred_flag value is 0, it is indicated that the inter-view residual prediction is not applied. When the flag iv_res_pred_flag value is 1, it is indicated that the inter-view residual prediction is applied.

The index iv_res_pred_weight_idx may indicate an index of the weighting factor employed for the residual prediction. When the index iv_res_pred_weight_idx value is 0, it is indicated that the residual prediction is not applied to the current block. When the index iv_res_pred_weight_idx value is not 0, it is indicated that the residual prediction is applied to the current block.

When the residual prediction is applied, the encoding device may perform coding encoding/decoding of the ARP flag for the current block with taking account of a correlation with an ARP flag for the neighboring block for encoding efficiency.

Figure 8:
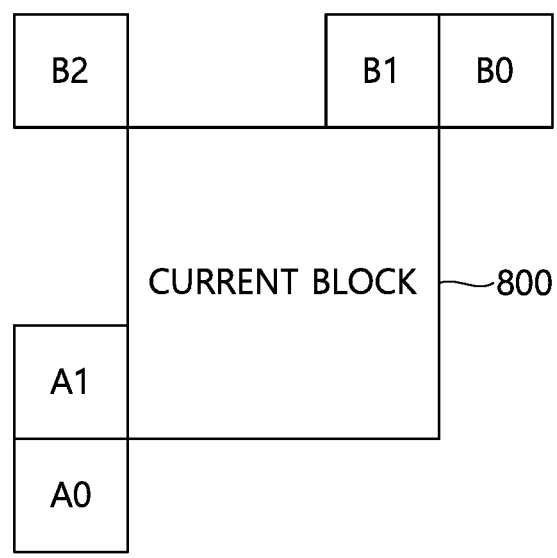
FIG. 8 schematically illustrates neighboring blocks with a current block.

FIG. 8 schematically illustrates neighboring blocks with a current block.

Referring to FIG. 8, a context model context may be determined using ARP flag information for A1 and B1 blocks among the neighboring blocks with the current block, wherein the context model is to be employed for encoding/decoding an ARP flag for the current block. As the context model may specify a context to be used for coding a syntax element, the context model may be a context index indicating a context to be applied to the syntax element. In this connection, the A1 block may be disposed at a left side of the current block, and the B1 block may be disposed at an upper side of the current block.

In this connection, the encoding and decoding devices may code the ARP flag for current block with consideration of both the A1 block and B1 block. In an alternative, the encoding and decoding devices may code the ARP flag for current block with consideration of the A1 block. Otherwise, the encoding and decoding devices may code the ARP flag for current block with consideration of the B1 block.

To be specific, when both the A1 block and B1 block are coded based on the residual prediction (that is, when both the upper-side neighboring block and left-side neighboring block are considered), and are coded based on the residual prediction, the context model value to be employed for coding the ARP flag for the current block may be 2.

When only a single block from the two neighboring blocks is coded based on the residual prediction, the context model value to be employed for coding the ARP flag for the current block may be 1.

For example, when both the left-side neighboring block and upper-side neighboring block are considered, but only a single block from the two neighboring blocks is coded based on the residual prediction, the context model value to be employed for coding the ARP flag for the current block may be 1.

Alternatively, when only the left-side neighboring block with the current block is considered, and the left-side neighboring block is coded based on the residual prediction, the context model value to be employed for coding the ARP flag for the current block may be 1. Alternatively, when only the upper-side neighboring block with the current block is considered, and the upper-side neighboring block is coded based on the residual prediction, the context model value to be employed for coding the ARP flag for the current block may be 1.

When all of the neighboring blocks A1 and B1 are not based on the residual prediction, the context model value to be employed for coding the ARP flag for the current block may be 0.

When both the left-side neighboring block and upper-side neighboring block are considered, but both the neighboring blocks A1 and B1 are not based on the residual prediction, the context model value to be employed for coding the ARP flag for the current block may be 0.

Alternatively, when only the left-side neighboring block with the current block is considered, but the left-side neighboring block is not coded based on the residual prediction, the context model value to be employed for coding the ARP flag for the current block may be 0. Alternatively, when only the upper-side neighboring block with the current block is considered, but the upper-side neighboring block is not coded based on the residual prediction, the context model value to be employed for coding the ARP flag for the current block may be 0.

Using the above-described calculated context model value, whether the residual prediction is applied for decoding the ARP flag for coding of the current block may be known.

When decoding the ARP flag, the context model for the current block may be set variably using the above-described context modelling. In this connection, the entropy decoding module may set the same initial value initValue for the context models (context indexes) applicable to coding of the ARP flag, to produce the contexts without consideration of a correlation between the neighboring blocks and current block.

Alternatively, the entropy decoding module may set different initial values initValue for the context models respectively, to produce a context with consideration of a correlation between the neighboring blocks and the current block. In this case, the probability may be more accurately reflected to the current block with consideration of the contexts of the neighboring blocks.

A following table 1 simply illustrates one example in which different initial values are applied respectively to the context models for the ARP flag:

TABLE 1

| Context model for current block | Initial value (Init value) |
|---|---|
| 0 | 162 |
| 1 | 153 |
| 2 | 154 |

When the inter-view residual prediction ARP is applicable to the current block, the encoding device may encode the ARP flag and send the flag, and, thereafter, may encode weighting factor information (ARP weighting index) and send the encoded information.

The ARP may employ one factor from total three weighting factors 0, 0.5, and 1. However, since the weighting factor being 0 means that the ARP is not employed, the weighting factor information (ARP weighting index) may act as information indicating whether the weighting factor is actually applied, and, at the same time, indicating which one of 0.5 weighting factor and 1 weighting factor is applied upon determination that the weighting factor is actually applied.

As described above, a context for the current block may be applied to the current block without taking account of the neighboring blocks. In this connection, when applying the ARP, in order to determine the weighting factor for ARP, the initial value (init value) for the context model regarding the weighting factor index may be set without consideration of occurrence frequencies of 0.5 weighting factor and 1 weighting factor.

Alternatively, as described above, a context to be applied to the current block may be determined with consideration of the neighboring blocks. In this case, a weighting factor to be applied to the current block may be determined with consideration of an occurrence frequency of each weighting factor. Generally, a case when the weighting factor index value is 1 may occur more frequently than a case when the weighting factor index value is 0.5. Thus, this fact may be reflected for determining the initial value. That is, the encoding device may code the weighting factor information iv_res_pred_weight_idx with consideration of the contexts of the neighboring blocks and send the coded information, thereby to allow indication of whether to apply the ARP to the current block 0∥ ARP. Alternatively, when the weighting factor information iv_res_pred_weight_idx is not a value indicating that the ARP is not to be applied, the iv_res_pred_weight_idx value may indicate whether to apply the ARP, and which weighting factor to be applied.

Alternatively, the decoding device may receive the iv_res_pred_weight_idx value as the weighting factor information in a bitstream, and may perform decoding with consideration of the neighboring blocks. When the decoded iv_res_pred_weight_idx value is 0, the decoding device may apply the inter-layer residual prediction ARP. When the iv_res_pred_weight_idx value as the decoded weighting factor information in not 0, the decoding device may apply the ARP to the current block by applying a weighting factor corresponding to the weighting factor information value.

In this connection, as described above, a method for reflecting the neighboring blocks may include any one of (1) reflecting the left-side block relative to the current block, (2) reflecting the upper-side block relative to the current block, and (3) reflecting both the left-side block and the upper-side block relative to the current block.

In an alternative, the method for reflecting the neighboring blocks may include reflecting how the same syntax element is decoded in the neighboring block. For example, when decoding the weighting factor information for the current block with consideration of the left-side block, the decoding device may decode the weighting factor information based on a value of weighting factor information decoded for the left-side block.

A following table 2 represent one example of an initial value table to be employed for coding the syntax element related to the weighting factor:

TABLE 2

| Context model for current block | Initial value (Init value) |
|---|---|
| 3 | 162 |

In the above table 2, the initial value may be determined with consideration of the neighboring blocks. Alternatively, the context model may be determined with consideration of the neighboring blocks. Although not shown in the table 2, determining the context index increment or context index offset may be based on the neighboring blocks.

Until now, for the sake of convenience of illustration, there have been described the cases in which the syntax information is decoded with consideration of the neighboring block which is at least one of the left-side block and the upper-side block. However, The present invention is not limited thereto. For example, when coding the ARP flag or weighting factor information with consideration of the neighboring block, the context model may be determined with consideration of at least one of the neighboring blocks A0, A1, B0, B1, and B2 as shown in FIG. 8. In this case, the number of the context models may be determined based on the number of the neighboring blocks which may be considered for decoding the syntax element.

Regarding the IVMC, information syntax elements necessary for applying the IVMC may be encoded as in the inter-layer residual prediction, and may be sent in a bitstream.

For example, for implementing the IVMC, a flag to indicate whether to compensate for a view mismatch at a block level for a current block may be required. The flag may be likely to be greatly associated with view mismatch statistics for the neighboring blocks with the current block. That is, when the neighboring blocks were subjected to compensation for the view mismatches thereof, the current block may be likely to be subjected to compensation for the view mismatch thereof.

Thus, when coding the mismatch flag indicating whether to apply to the current block the view mismatch compensation, for example, luminance compensation, the view mismatch correlation between the current block and the neighboring blocks may be taken into account, leading to more reliable coding of the mismatch flag.

A conventional mismatch flag coding method does not reflect a correlation between the mismatch flags for the current block and neighboring blocks. Thus, the mismatch flag for the current block may be coded using a single context model.

To the contrary, in accordance with the present invention where the mismatch flag for the current block is coded with consideration of the correlation between the mismatch flags for the current block and neighboring blocks, the coding efficiency for the mismatch flag for the current block may be enhanced. In this regard, the consideration of the correlation between the mismatch flags for the current block and neighboring blocks may result in creation of a plurality of the context models.

In the present invention, a context model corresponding to the mismatch flag for the current block may be selected from total three context models based on a correlation between the context models of the neighboring blocks and the current block. Then, the coding may be performed using the selected context model.

The neighboring blocks with the current block as shown in FIG. 8 may be employed for coding the mismatch flag. For example, the encoding and decoding devices may consider at least one of the left-side block A1 and upper-side block B1 relative to the current block for coding the mismatch flag.

A following equation 2 may express a method for determining the mismatch flag value for the current block using a mismatch flag ic_flag (A1) for the neighboring block A1, and a mismatch flag ic_flag (B1) for neighboring block B2:

$$ctx\_current=(ic\_flag(A1)!=0)?1:0+(ic\_flag(B1)!=0)?1:0 \qquad <\text{equation 2}>$$

In the above equation 2, when the IVMC was applied to the A1 block, the ic_flag (A1) value is 1. To the contrary, when the IVMC was not applied to the A1 block, the ic_flag (A1) value is 0. In the same way, when the IVMC was applied to the B1 block, the ic_flag (B1) value is 1. To the contrary, when the IVMC was not applied to the B1 block, the ic_flag (B1) value is 0.

Therefore, when the IVMC was applied to both the blocks A1 and B1, the context model ctx_current value for the mismatch flag ic_flag for the current block is 2. When the IVMC was applied to one of the blocks A1 and B1, the context model ctx_current value for the mismatch flag ic_flag for the current block is 1. When the IVMC was not applied to all of the blocks A1 and B1, the context model ctx_current value for the mismatch flag ic_flag for the current block is 0.

When the ctx_current value is 2, this may mean a high probability of the IVMC being applied to the current block. When the ctx_current value is 0, this may mean a low probability of the IVMC being applied to the current block. In this way, each initial value suitable for each context model may be assigned to the mismatch flag ic_flag for the current block using the ctx_current value resulting from reflecting the neighboring blocks. A following table 3 may represent each initial value (init value) assigned to the mismatch flag ic_flag based on each context model ctx_current value.

TABLE 3

| ctx_current value | initial value (init value) |
|---|---|
| 0 | 154 |
| 1 | 154 |
| 2 | 154 |

For the sake of convenience of illustration, there has been described for the case in which the syntax information ic_flag is decoded with consideration of the neighboring blocks which is the left-side block A1 and upper-side block B1. However, the present invention is not limited thereto. The context models to be employed for coding the mismatch flag ic_flag for the current block may be determined using a variety of combinations of the neighboring blocks A0, A1, B0, B1, and B2 as shown in FIG. 8.

For example, the context model to be employed for coding (encoding/decoding) the mismatch flag ic_flag for the current block may be determined using the neighboring blocks A0, B0, and B2. In this case, the context model ctx_current value for the current block may be calculated by applying each mismatch flag ic_flag value of each neighboring block using a following equation 3:

$$ctx\_current=(ic\_flag(A0)!=0)?1:0+(ic\_flag(B0)!=0)?1:0+(ic\_flag(B2)!=0)?1:0 \qquad <\text{equation 3}>$$

The encoding and decoding devices may assign an initial value to be employed for coding the mismatch flag ic_flag for the current block based on the determined context module ctx_current value for the current block using the above equation 3.

Alternatively, the context model to be employed for coding (encoding/decoding) the mismatch flag ic_flag for the current block may be determined using all of the neighboring blocks as shown in FIG. 8. In this case, the context model ctx_current value for the current block may be calculated by applying each mismatch flag ic_flag value of each neighboring block using a following equation 4. In this way, the encoding and decoding devices may assign an initial value to be employed for coding the mismatch flag ic_flag for the current block based on the determined context module ctx_current value for the current block using the above equation 4:

$$ctx\_current=(ic\_flag(A0)!=0)?1:0+(ic\_flag(A1)!=0)?1:0+(ic\_flag(B0)!=0)?1:0+(ic\_flag(B1)!=0)?1:0+(ic\_flag(B2)!=0)?1:0 \qquad <\text{equation 4}>$$

In the above equation 4, the mismatch flag ic_flag (AX) refers to a mismatch flag ic_flag for the block AX (X=0, 1). The mismatch flag ic_flag (BY) refers to a mismatch flag ic_flag for the block BY (Y=0, 1).

In this way, the context model may vary based on the neighboring blocks to be taken into account for coding the mismatch flag for the current block.

Figure 9:
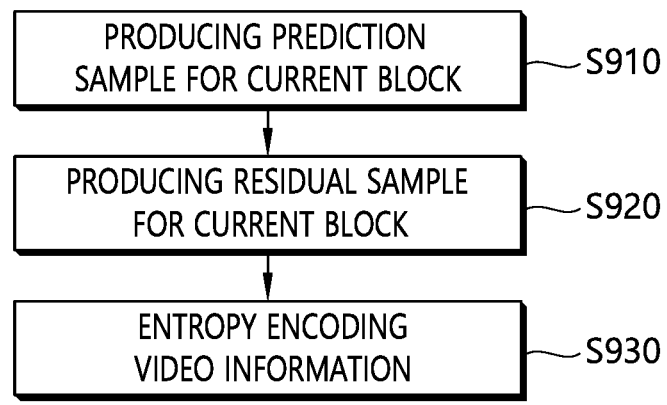
FIG. 9 is a flow chart for illustrating operations of a video encoding device in accordance with the present invention.

FIG. 9 is a flow chart for schematically illustrating operations of a video encoding device in accordance with the present invention.

Referring to FIG. 9, the encoding device may produce the prediction sample for the current block (S910). For this producing, the encoding device may apply the inter-view residual prediction to the current block. Alternatively, the encoding device may perform the mismatch compensation for the current block to produce the prediction sample. Details about the inter-view residual prediction and mismatch compensation may be the same as described above in details.

The encoding device may produce the residual sample for the current block (S920). The encoding device may produce the residual sample as a difference between the prediction sample produced via the inter-view residual prediction and/or mismatch compensation, and an original sample for the current block.

The encoding device may perform entropy decoding of video information for video decoding (S930). The encoding device may output the entropy decoded video information in a bitstream. The outputted bitstream may be delivered over a network and/or may be stored in a storage medium. The video information may include information specifying the residual sample value or residual sample value for the current block. The video information may include information (for example, ARP flag and/or weighting factor index) to be employed for the inter-view residual prediction, and information (for example, IC flag) to be employed for the mismatch compensation.

Figure 10:
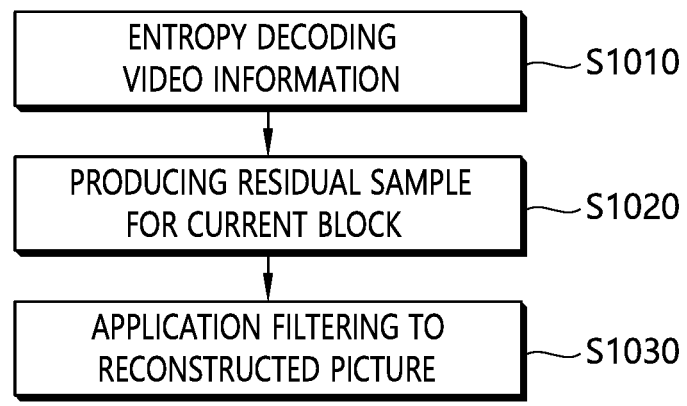
FIG. 10 is a flow chart for illustrating operations of a video decoding device in accordance with the present invention.

FIG. 10 is a flow chart for schematically illustrating operations of a video decoding device in accordance with the present invention.

Referring to FIG. 10, the decoding device may perform entropy decoding of the video information contained in the bitstream (S1010). The entropy decoded video information by the decoding device may include not only the residual information for the current block, but also the syntax element values to be employed for the current block recovery.

For example, the decoding device may perform entropy decoding of information indicating whether the inter-view residual prediction is able to be applied to the current block. When the inter-view residual prediction is able to be applied to the current block, the decoding device may further perform entropy decoding of information about the weighting factor to be applied thereto.

The decoding device may perform entropy decoding of information indicating whether to apply the mismatch compensation to the current block.

The decoding device may produce the prediction sample for the current block based on the above entropy decoded information (S1020). For this producing, the decoding device may apply the inter-view residual prediction to the current block. Alternatively, the decoding device may carry out the mismatch compensation for the current block to produce the prediction sample. Details about the inter-view residual prediction and mismatch compensation may be the same as described above in details.

The decoding device may produce the recovery sample based on the produced prediction sample and residual sample, and, then, recover the current picture using the produced recovery sample. The recovery operation for the sample may be carried out on a block unit or picture unit basis.

The decoding device may apply filtering to the recovered picture (S1030). In this connection, the filtering may be carried out a de-blocking filter. Further, application of an offset of a sample unit may allow the recovered picture to be more similar to the original picture.

Although in the above described system, each of the methods is described with reference to the flow chart presenting a series of steps or blocks, the present invention is not limited to the orders of the steps as described above. The orders of the steps may vary. For example, a certain step may occur as descried above, or may be concurrent with another step. Further, the above described embodiments may include examples having a variety of aspects. Thus, the present invention is intended to encompass alternatives, modifications, and/or variations as included in attached claims.

What is claimed is:

1. A video decoding method for decoding a multi-view video by a video decoding device, the method comprising:
   determining one of context models as a context model for a current block based on whether residual prediction was applied to at least one neighboring block;
   entropy decoding indication information about the residual prediction by applying the context model for the current block;
   producing a prediction sample for the current block when the indication information indicates to apply the residual prediction to the current block, wherein the prediction sample is produced based on a difference between sample values for first and second blocks respectively; and
   applying filtering to a current picture recovered using the prediction sample,
   wherein at least one of the first and second blocks is disposed in a different view from a view containing the current block,
   the first block is defined by either a motion vector or a disparity vector for the current block,
   the second block is defined by both the motion vector and the disparity vector for the current block,
   the indication information indicates whether to apply the residual prediction to the current block,
   the context models includes a first context model and a second context model,
   a different initial value is set for each of the first context model and the second context model,
   the context model for the current block is determined as the first context model having an index value of 0 when the residual prediction was not applied to a left-side block, and the value of the context model for the current block is determined as the second context model having an index value of 1 when the residual prediction was applied to the left-side block,
   an initial value for the first context model having the index value of 0 is set to 162, and
   an initial value for the second context model having the index value of 1 is set to 153.

2. A video encoding method for encoding a multi-view video by a video encoding device, the method comprising:
   determining whether a residual prediction is applied to a current block;
   determining one of context models as a context model for the current block based on whether the residual prediction was applied to at least one neighboring block; and
   entropy encoding indication information about the residual prediction by applying the context model for the current block;
   wherein a prediction sample of the current block is produced based on a difference between sample values for first and second blocks respectively when the residual prediction is applied to the current block; and
   wherein at least one of the first and second blocks is disposed in a different view from a view containing the current block,
   the first block is defined by either a motion vector or a disparity vector for the current block,
   the second block is defined by both the motion vector and the disparity vector for the current block,
   the indication information indicates whether to apply the residual prediction to the current block,
   the context models includes a first context model and a second context model,
   a different initial value is set for each of the first context model and the second context model,
   the context model for the current block is determined as the first context model having an index value of 0 when the residual prediction was not applied to a left-side block, and the value of the context model for the current block is determined as the second context model having an index value of 1 when the residual prediction was applied to the left-side block, an initial value for the first context model having the index value of 0 is set to 162, and an initial value for the second context model having the index value of 1 is set to 153.

3. A non-transitory computer-readable storage medium storing video information comprising: indication information generated by determining whether a residual prediction is applied to a current block, by determining one of context models as a context model for the current block based on whether the residual prediction was applied to at least one neighboring block, by entropy encoding the indication information about the residual prediction by applying the context model for the current block, wherein the indication information indicates whether to apply the residual prediction to the current block, the context models includes a first context model and a second context model, a different initial value is set for each of the first context model and the second context model, the context model for the current block is determined as the first context model having an index value of 0 when the residual prediction was not applied to a left-side block, and the value of the context model for the current block is determined as the second context model having an index value of 1 when the residual prediction was applied to the left-side block, an initial value for the first context model having the index value of 0 is set to 162, and an initial value for the second context model having the index value of 1 is set to 153.

\* \* \* \* \*